United States Patent [19]

Toyama et al.

[11] Patent Number: 5,615,053
[45] Date of Patent: Mar. 25, 1997

[54] BIAXIAL ACTUATOR

[75] Inventors: Kazuhiko Toyama; Shingo Shimokawa, both of Chiba, Japan

[73] Assignee: Sony Corporation, Tokyo, Japan

[21] Appl. No.: 515,803

[22] Filed: Aug. 16, 1995

[30] Foreign Application Priority Data

Aug. 25, 1994 [JP] Japan .................... 6-224183
Sep. 21, 1994 [JP] Japan .................... 6-253020

[51] Int. Cl.$^6$ .................................................. G02B 7/02
[52] U.S. Cl. .......................... 359/813; 359/814; 359/822; 369/44.14
[58] Field of Search ........................... 359/813, 814, 359/811, 819, 822, 824; 369/44.14, 44.15, 44.16

[56] References Cited

U.S. PATENT DOCUMENTS

| | | | |
|---|---|---|---|
| 5,265,079 | 11/1993 | Getreuer et al. | 369/44.14 |
| 5,453,881 | 9/1995 | Suzuki | 359/824 |
| 5,508,851 | 4/1996 | Tachizawa | 359/822 |

*Primary Examiner*—Loha Ben
*Attorney, Agent, or Firm*—Jay H. Maioli

[57] ABSTRACT

A biaxial actuator for an optical pickup wherein by the downward stroke of the lens holder being limited by abutment of the lens holder with the slide base and the adjusting plate and the actuator cover each being fixed to the slide base or by the actuator cover being fixed to the yoke and fixing elements for fixing the actuator cover to the yoke being provided at front and rear end portions of the actuator cover and the yoke dispersion in the focussing direction stroke of the lens holder is reduced, the stroke of the lens holder is not limited even when the lens holder is mounted diagonally, and the actuator cover is correctly positioned and firmly held with respect to the yoke with no looseness therebetween.

5 Claims, 4 Drawing Sheets

BIAXIAL ACTUATOR

BACKGROUND OF THE INVENTION

This invention relates to a biaxial actuator for an optical pickup of an optical disc recording and reproduction device using an optical disc such as for example a CD, LD, MO or MD.

This kind of biaxial actuator for an optical pickup is used in recording and reproducing signals to and from an optical disc such as for example a CD, LD, MO or MD. This actuator moves an objective lens mounted on a supporting member in two directions, a focussing direction and a tracking direction.

Among biaxial actuators of this kind, there are for example those constituted as shown in FIG. 1. Referring to FIG. 1, a biaxial actuator 100 comprises a slide base 103 mounted on a reference shaft 102, an inclination angle adjusting plate 104 mounted for oscillatory movement on the slide base 103, an XY adjusting plate 105 mounted on this inclination angle adjusting plate 104, a lens holder 106 mounted on the XY adjusting plate 105, and an actuator cover 107 disposed covering the lens holder 106 from the sides and from above.

The slide base 103 is mounted movably along the reference shaft 102. When the slide base 103 moves along the reference shaft 102, an objective lens 106a mounted in the lens holder 106 moves in the radial direction of an optical disc.

In the example shown in FIG. 1, a downwardly projecting convex portion 104a of the inclination angle adjusting plate 104 fits in a concave recess 103a provided in the upper surface of the slide base 103, and this convex portion 104a slides in the concave recess 103a. As a result, the inclination angle adjusting plate 104 can oscillate in any direction with respect to the slide base 103.

The XY adjusting plate 105 is mounted movably in two horizontal directions, namely X and Y directions, with respect to this inclination angle adjusting plate 104, and inclination of the lens holder 106 is thereby corrected.

The lens holder 106 is mounted by way of a suspension 106b movably in two directions orthogonal to the direction toward the XY adjusting plate 105, namely a tracking direction and a focussing direction.

The actuator cover 107 is fixed to the XY adjusting plate 105 and covers the lens holder 106 from the sides and from above without obstructing movement of the lens holder 106 in the tracking direction and in the focussing direction.

In the biaxial actuator 100 so constituted, by drive voltages being supplied to drive coils mounted on the lens holder 106, magnetic flux generated at the drive coils interacts with magnetic flux from a yoke and magnets (not shown in FIG. 1) mounted on the XY adjusting plate 105. As a result, the objective lens 106a mounted in the lens holder 106 moves in the focussing direction and the tracking direction.

However, in this kind of biaxial actuator adjusting device, the stroke of the lens holder 106 in the focussing direction is limited in the following way:

The upward stroke extent P of the lens holder 106 is limited by the top of the lens holder 106 abutting with the inner surface of the actuator cover 107. The downward stroke extent Q of the lens holder 106 is limited by the bottom of the lens holder 106 abutting with the upper surface of the XY adjusting plate 105.

As shown in FIG. 1, the position of the inner surface of the actuator cover 107 is decided by the dimension A between the upper surface of the slide base 103 and the center of the reference shaft 102, the dimension B of the inclination angle adjusting plate 104, the dimension C of the XY adjusting plate 105 and the dimension D of the actuator cover 107.

Therefore, the position of the inner surface of the actuator cover 107, that is, the upward stroke extent P of the lens holder 106, has dimensional dispersion depending on the dimensional accuracy of the dimensions A, B, C and D of the above-mentioned members.

Also, the position of the upper surface of the XY adjusting plate, as shown in FIG. 1, is decided by the dimension A between the upper surface of the slide base 103 and the center of the reference shaft 102, the dimension B of the inclination angle adjusting plate 104 and the dimension C of the XY adjusting plate 105.

Therefore, the position of the upper surface of the XY adjusting plate 105, that is, the downward stroke extent Q of the lens holder 106, has dimensional dispersion depending on the dimensional accuracy of the dimensions A, B and C of the above members.

Thus there has been the problem that relatively large dispersions occur in the upward stroke extent P and the downward stroke extent Q of the lens holder 106 depending on the dimensional accuracy of the slide base 103, the inclination angle adjusting plate 104, the XY adjusting plate 105 and the actuator cover 107.

Also, when the lens holder 106 is mounted diagonally with respect to the XY adjusting plate 105, as shown in FIG. 2, although this inclination of the lens holder 106 is corrected by the inclination angle adjusting plate 104, there has been the problem that because the lens holder 106 is at an incline in the space bounded by the XY adjusting plate 105 and the actuator cover 107, compared to when the lens holder 106 is mounted substantially horizontally with respect to the XY adjusting plate 105 the upward stroke extent P and the downward stroke extent Q are more limited.

A biaxial actuator has a lens holder in the end of which an objective lens is mounted and a coil bobbin mounted on this lens holder using adhesive or the like.

The lens holder is mounted movably in two directions orthogonal to a fixed part, namely the tracking direction and the focussing direction, by way of two sheet springs each having one end fixed to one side of the lens holder and the other end fixed to the fixed part.

The coil bobbin has a focussing coil and a tracking coil wound thereon. Magnetic flux generated at the coils by current being passed through the coils interacts with magnetic flux from a yoke mounted on the fixed part and magnets mounted on the yoke.

Here, the above-mentioned yoke is mounted as shown in FIG. 3. That is, referring to FIG. 3, in a biaxial actuator 200, an actuator cover 204 is mounted from above on a yoke 203 fixed to a biaxial base 202 of the biaxial actuator 200.

The yoke 203 has a yoke portion 203b extending upward from two sides of a flat base 203a so as to form a U-shape (not shown in FIG. 3). This yoke portion 203b, when seen from the side, as shown in FIG. 3, has projecting portions 203c and 203d extending to the front and rear so that the overall yoke portion 203b forms a T-shape, and projections 203e and 203f extending upward from the upper edge.

The actuator cover 204 has large openings on both sides and has hooks 204a and 204b extending downward from two places on both side edges thereof. These hooks 204a and 204b have engaging claws 204c projecting inward from their lower ends as shown in FIG. 5.

In a biaxial actuator 200 thus constituted, by the actuator cover 204 being placed on the yoke 203 the lower end 204d of the actuator cover 204 abuts with the upper surfaces of the projections 203e and 203f of the yoke portion 203b of the yoke 203 (see FIG. 4). The hooks 204a and 204b of the actuator cover 204 grip the yoke portion 203b of the yoke 203 from both sides.

The engaging claws 204c at the ends of the hooks 204a and 204b engage with the lower edges of the projecting portions 203c and 203d of the yoke portion 203b. As a result, the actuator cover 204 is held on the yoke 203 and covers above the biaxial base 202.

However, in a biaxial actuator 200 of this kind of constitution, because the width t1 of the lower ends 204d of both side edges of the actuator cover 204 is larger than the width t2 between the outer sides of the projections 203e and 203f on the yoke portion 203b of the yoke 203, there is a looseness between the yoke 203 and the actuator cover 204. When an effort is made to eliminate this looseness the width t1 is made slightly smaller than the width t2 resulting in a slight press-fit, there has been the problem that the actuator cover 204 is deformed.

Also, because as shown in FIG. 5 the thickness t3 and the width w of the hooks 204a and 204b are relatively small and the hooks are relatively long, they deform easily. As a result, they have sometimes disengaged from the lower edges of the projecting portions 203c and 203d of the yoke portion 203b of the yoke 203.

Also, because the width t2 between the outer sides of the projections 203e and 203f is relatively small compared to the overall length of the actuator cover 204, the stability of the actuator cover 204 is not very good. There has also been the problem that because the rear end portion of the actuator cover 204 abuts the biaxial base 202 it tends to slip.

OBJECT AND SUMMARY OF THE INVENTION

In view of these problems, an object of the invention is to reduce the dispersion in the focussing direction stroke of the lens holder and provide a biaxial actuator with which the stroke of the lens holder is not limited even when the lens holder is mounted diagonally.

Another object of the invention is to provide a biaxial actuator wherein the actuator cover is correctly positioned and firmly held with respect to the yoke with no looseness therebetween.

To achieve the above object and other objects, the invention provides a biaxial actuator comprising a slide base, a lens holder used for adjusting the position of an objective lens with respect to the slide base, and an actuator cover mounted covering the lens holder, wherein the lens holder is mounted on an adjusting plate for adjusting the position of the lens holder with respect to the slide base, the stroke of the lens holder in one direction is limited by abutment with the slide base, and the adjusting plate and the actuator cover are each fixed to the slide base.

The invention also provides a biaxial actuator comprising a biaxial base which is a base member, a yoke and an actuator cover fixed to the yoke for covering the biaxial actuator, wherein fixing means for fixing the actuator cover to the yoke are provided at front and rear end portions of the actuator cover and the yoke.

DETAILED DESCRIPTION OF THE PREFERRED EMBODIMENTS

Preferred embodiments of the invention will now be described in detail with reference to the accompanying drawings.

Because the preferred embodiments described below are specific examples of the invention, various limitations have been attached thereto; however, the invention is not limited to the embodiments described below.

First Preferred Embodiment

Figure 1:
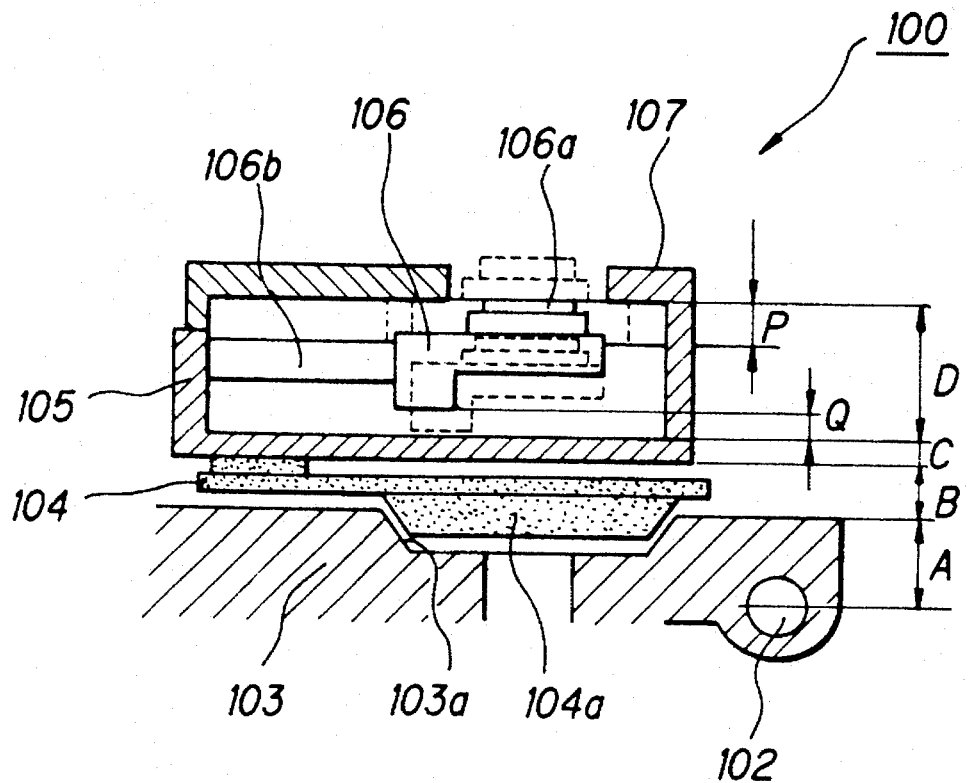
FIG. 1 is a schematic sectional view of an example of a conventional biaxial actuator.
Figure 2:
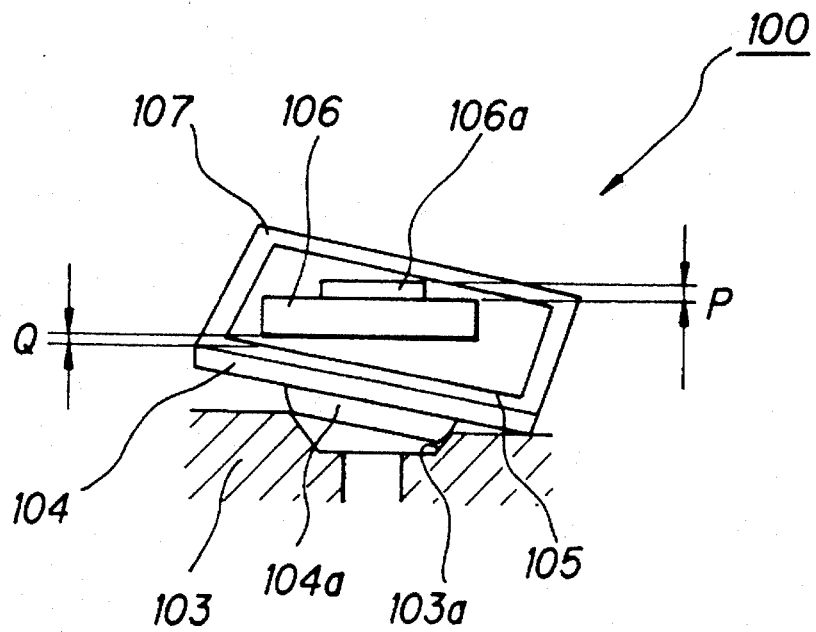
FIG. 2 is a schematic view of a lens holder mounted diagonally in the biaxial actuator of FIG. 1.
Figure 3:
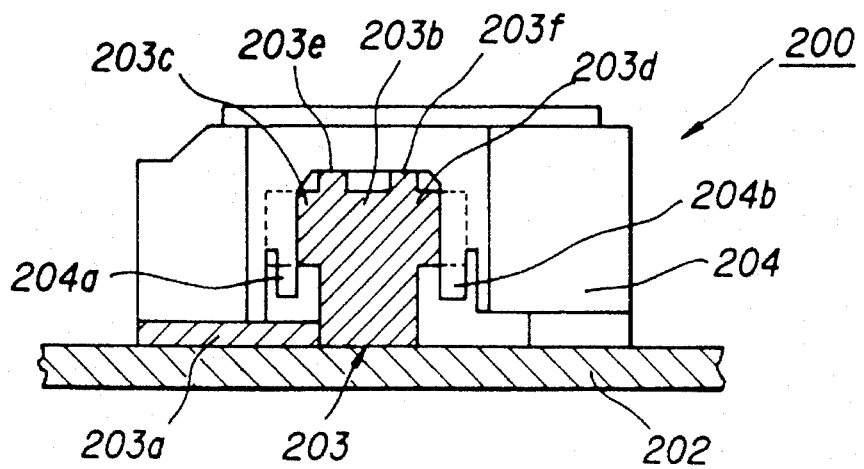
FIG. 3 is a sectional view of a main part of an example of a conventional biaxial actuator.
Figure 4:
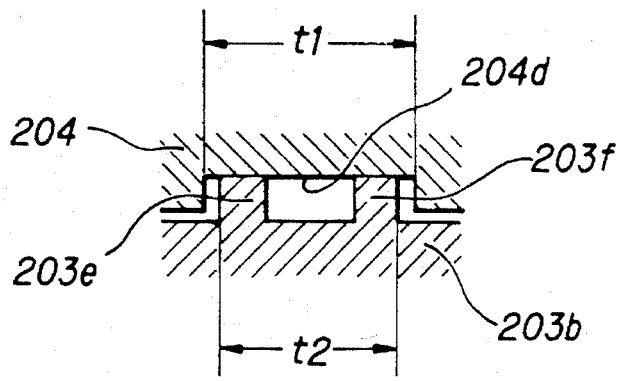
FIG. 4 is a partial enlarged sectional view of abutting portions of an actuator cover and a yoke of the biaxial actuator of FIG. 3.
Figure 5:
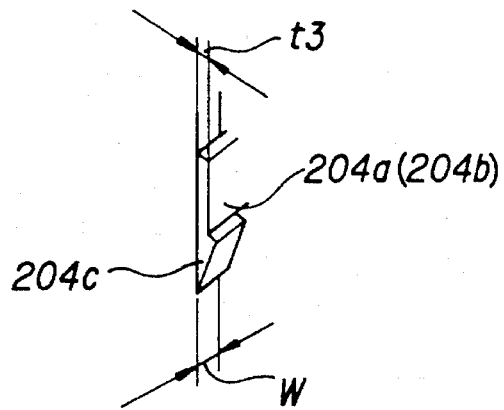
FIG. 5 is an enlarged perspective view of a hook of an actuator cover in the biaxial actuator of FIG. 3.
Figure 6:
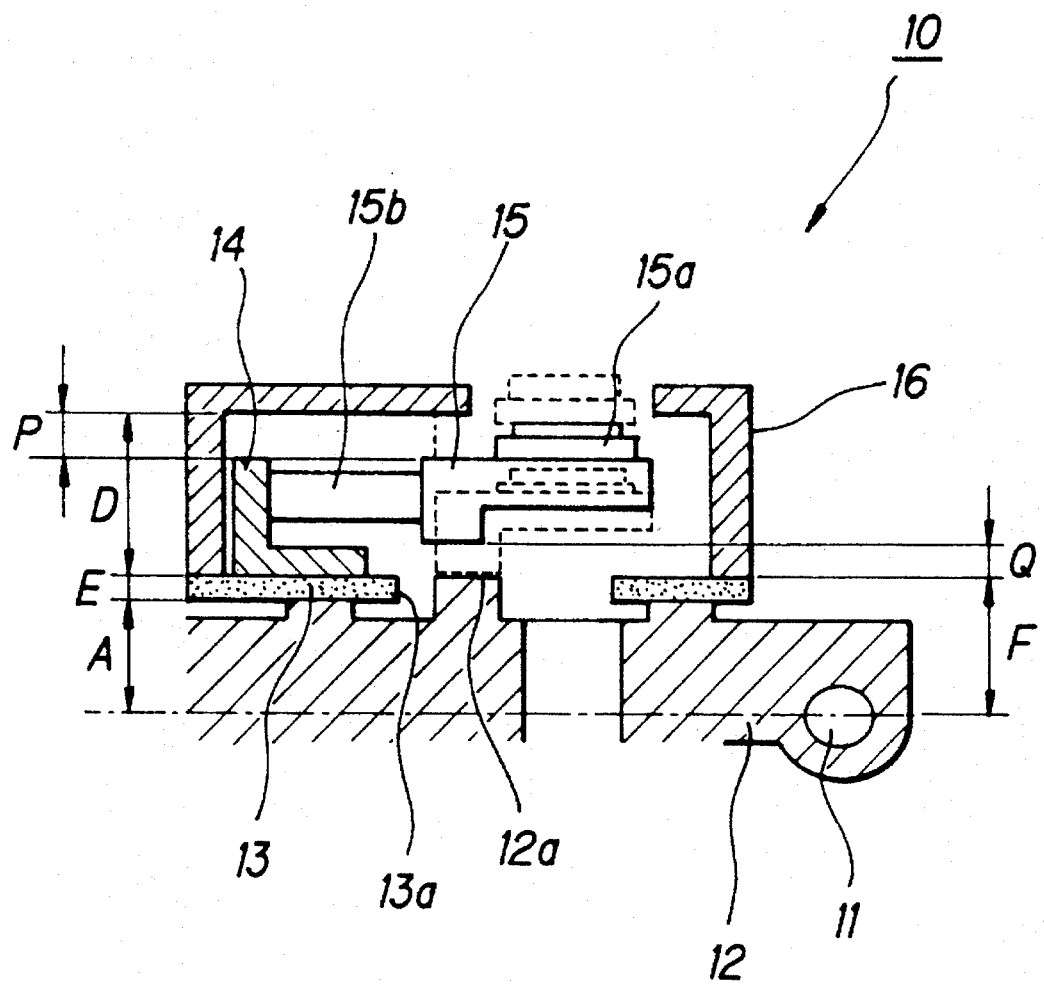
FIG. 6 is a schematic sectional view of a first preferred embodiment of a biaxial actuator according to the invention.

FIG. 6 shows a first preferred embodiment of a biaxial actuator according to the invention for an optical pickup of an optical disc recording and reproduction apparatus.

Referring to FIG. 6, a biaxial actuator 10 comprises a slide base 12 mounted on a reference shaft 11, a fixed plate 13 fixed to this slide base 12, an adjusting plate 14 mounted on this fixed plate 13, a lens holder 15 mounted on this adjusting plate 14 by way of a suspension 15b, and an actuator cover 16 disposed covering this lens holder 15 from the sides and from above.

The slide base 12 is mounted movably along the reference shaft 11. As a result, an objective lens 15a mounted in the lens holder 15 moves in the radial direction of an optical disc.

The fixed plate 13 is fixed to an upper surface of the slide base 12 and is so provided with a cutaway portion 13a that it does not obstruct movement of the lens holder 15 when the lens holder 15 moves downward.

The adjusting plate 14 has its inclination angle adjusted in any direction with respect to the upper surface of the fixed plate 13 and is mounted movably in two horizontal directions with respect to the upper surface of the fixed plate 13, namely the X and Y directions.

The lens holder 15 is mounted by way of the suspension 15b movably in two directions orthogonal to the direction toward the adjusting plate 14, namely the tracking direction and the focussing direction.

The actuator cover 16 is fixed to the fixed plate 13 and covers the lens holder 15 from the sides and from above without obstructing movement of the lens holder 15 in the tracking direction and the focussing direction.

In a biaxial actuator 10 according to this invention, when drive voltages are supplied from outside to drive coils provided on the lens holder 15, magnetic flux generated at the drive coils interacts with magnetic flux from a fixed yoke and magnets (not shown in the drawings). As a result the objective lens 15a mounted in the lens holder 15 is moved in the focussing direction and the tracking direction.

The upward stroke extent P of the lens holder 15 is limited by the top of the lens holder 15 abutting with the inner surface of the actuator cover 16. The downward stroke extent Q of the lens holder 15 is limited by the bottom of the lens holder 15 abutting with the upper surface of the slide base 12.

Here, as shown in FIG. 6, the position of the inner surface of the actuator cover 16 is decided by the dimension A between upper surfaces of the slide base 12 and the center of the reference shaft 11, the dimension E of the fixed plate 13 and the dimension D of the actuator cover 16.

Therefore, the position of the inner surface of the actuator cover 16, that is, the upward stroke extent P of the lens holder 15, has dimensional dispersion depending on the dimensional accuracy of the dimensions A, E and D of the members mentioned above.

Also, the position 12a where the lens holder 15 abuts the slide base 12 is decided by only the dimension F between an upper surface of the slide base 12 and the center of the reference shaft 11.

Therefore, the position 12a of the slide base 12, that is, the downward stroke extent Q of the lens holder 15, has dimensional dispersion depending on the dimensional accuracy of the dimension F of the slide base 12.

Thus, because the dimensional dispersion is decided by the dimensional accuracy of the dimensions A, D, E and F of the various members, i.e. the slide base 12, the fixed plate 13 and the actuator cover 16, the dispersions in the upward stroke extent P and the downward stroke extent Q of the lens holder 15 are markedly reduced compared with those in conventional biaxial actuators.

Furthermore, when the lens holder 15 is mounted diagonally, the inclination of this lens holder 15 is corrected by the adjusting plate 14. However, in this case, the lens holder 15 has a stroke bounded by the position 12a of the slide base 12 and the lower surface of the actuator cover 16. Therefore, unlike conventional cases, the upward stroke extent P and the downward stroke extent Q of the lens holder 15 are not severely limited even compared to when the lens holder 15 is mounted on the adjusting plate 14 substantially horizontally with respect to the upper surface of the fixed plate 13.

In the preferred embodiment described above, simply a biaxial actuator for an optical pickup of an optical disc recording and reproduction apparatus was described; however, the invention can clearly be applied to a biaxial actuator for an optical pickup of an optical disc recording and reproduction apparatus or an optical disc reproduction apparatus using for example a CD, LD, MO or MD.

As described above, according to the invention, it is possible to provide a biaxial actuator wherein dispersion in the focussing direction stroke of the lens holder is reduced and even when the lens holder is mounted diagonally the stroke of the lens holder is not limited.

Second Preferred Embodiment

Figure 7:
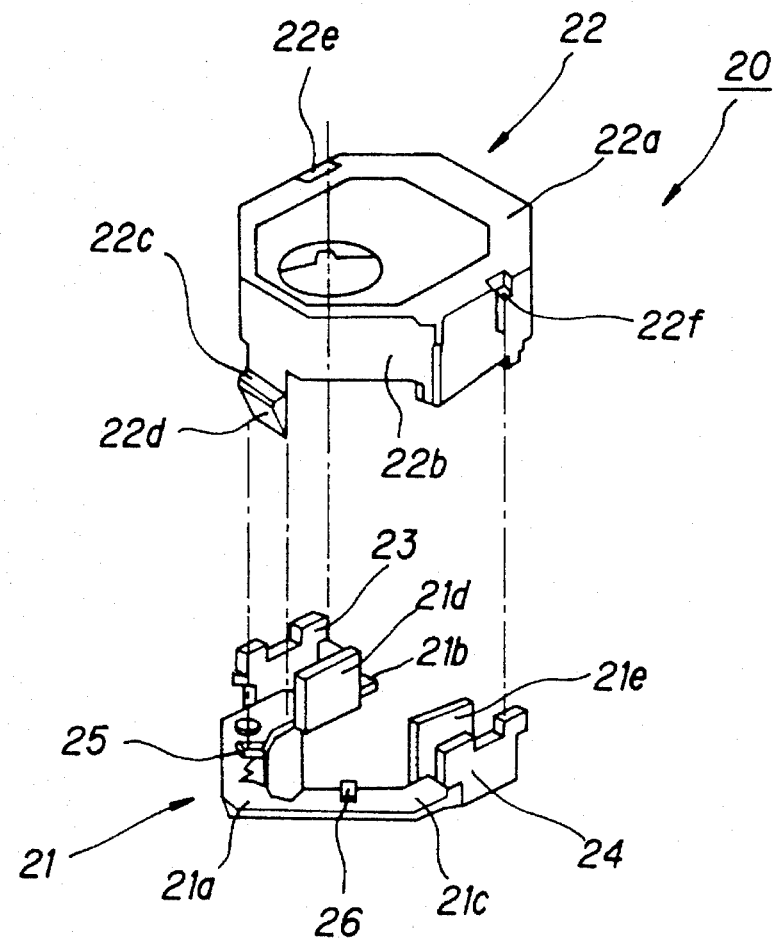
FIG. 7 is an exploded perspective view of a main part of a second preferred embodiment of a biaxial actuator according to the invention.

A second preferred embodiment of a biaxial actuator according to the invention is shown in FIG. 7.

Referring to FIG. 7, in a biaxial actuator 20, an actuator cover 22 is mounted on a yoke 21 formed integrally with a biaxial base.

Here, the yoke 21, in the case shown in FIG. 7, is formed integrally with the biaxial base and has yoke portions 21d and 21e extending upward from the inner side edges of rear end portions 21b and 21c extending to the rear of a flat base 21a formed in an approximate U-shape facing rearward and upright portions 23 and 24 extending upward from the outer side edges of the these rear end portions 21b and 21c.

These upright portions 23 and 24 extend upward from the outer side edges of the rear end portions 21b and 21c of the yoke 21 and rear edge upper portions thereof are formed in an inverted L-shape projecting to the rear. As a result, these upright portions 23 and 24 have downwardly facing step portions 23a and 24a at their rear edges.

Also, this yoke 21 has dowels 25 and 26 projecting upward on both sides of the front region of the flat base 21a.

The actuator cover 22 comprises a substantially annular upper portion 22a and a side portion 22b extending downward from the outer edge of this upper portion 22a in correspondence with the base 21a and the rear end portions 21b and 21c of the yoke 21.

Figure 8:
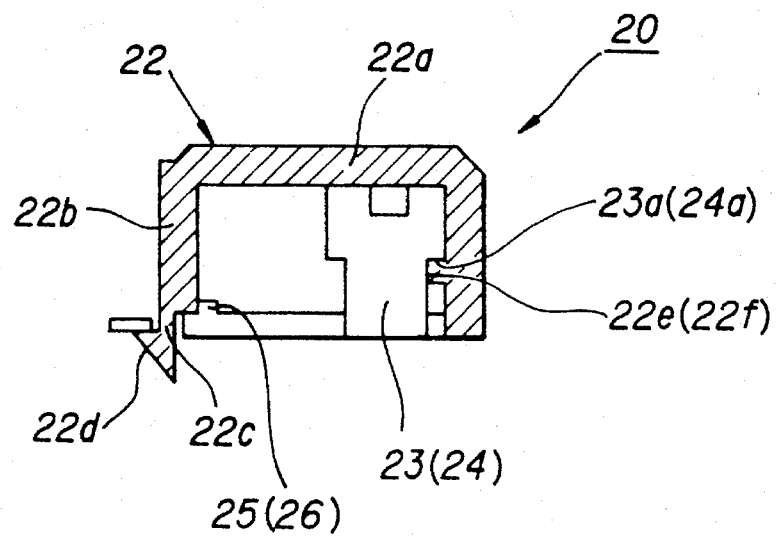
FIG. 8 is a sectional view of a main part of the biaxial actuator of FIG. 7.

This actuator cover 22 has a hook 22c extending downward from the lower edge of the front end of the side portion 22b, and this hook 22c has an engaging claw 22d projecting forward from the lower end thereof. As shown in FIG. 8, when the actuator cover 22 is placed on the yoke 21, the hook 22c enters the base 21a of the yoke 21 from the rear edge and this hook 22c engages with the lower edge of the base 21a.

As a result, the front part of the actuator cover 22 is positioned and held with respect to the yoke 21 in the vertical direction. Also, the lower edge of the front part of the upper portion 22a of the actuator cover 22 abuts the upper surface of the base 21a of the yoke 21 and the inner sides thereof engage with the dowels 25 and 26 provided on the base 21a of the yoke 21, whereby rearward movement of the actuator cover 22 is prevented.

The inner surface of the rear end of the side portion 22b of the actuator cover 22 has a pair of dowels 22e and 22f projecting forward. As shown in FIG. 8, when the actuator cover 22 is placed on the yoke 21, these projections 22e and 22f engage with the step portions 23a and 24a of the upright portions 23 and 24 of the yoke 21.

As a result, the rear portion of the actuator cover 22 is positioned and held with respect to the yoke 21 in the vertical direction, and by the end surfaces of the dowels 22e and 22f abutting with the side edges of the upright portions 23 and 24, forward movement of the actuator cover 22 is prevented.

In the biaxial actuator 10 according to this preferred embodiment constituted as described above, by the actuator cover 22 being placed on the yoke 21 the rear end of the actuator cover 22 first fits onto the rear end portions 21b and 21c of the yoke 21 and then the dowels 22e and 22f are engaged with the step portions 23a and 24a of the upright portions 23 and 24 of the yoke 21.

At this time, the lower surface of the upper portion 22a of the actuator cover 22 abuts the upper edges of the upright portions 23 and 24. After that, the front hook 22c of the actuator cover 22 engages with the lower edge of the rear side of the base 21a of the yoke 21. As a result, the actuator cover 22 is positioned and held in the vertical direction and is also positioned and held in the front-rear direction. Thus the actuator cover 22 is fixed with respect to the yoke 21 and covers the upper part of the biaxial base.

As described above, in this preferred embodiment front and rear parts of the actuator cover are positioned with respect to the yoke by a hook and dowels. As a result, this actuator cover is fixed without any looseness in the front-rear direction. Furthermore, by the front edge and the rear edge of this actuator cover being held with respect to the yoke, because the distance between the two holding portions is relatively long, the actuator cover is stably fixed to the yoke.

Also, because there is ample space for the hook, there are no limits on the thickness and width of the hook and the hook is strong and consequently does not deform much.

Therefore, the actuator cover is firmly fixed to the yoke in an accurately positioned and stable state without looseness and without the hook deforming.

In the preferred embodiment described above, the yoke 21 is formed integrally with the biaxial base of the biaxial actuator 10; however, the invention is not limited to this arrangement and can also be applied in a case where the yoke 21 is formed separately from the biaxial base.

As described above, the invention provides a superior biaxial actuator wherein the actuator cover is accurately positioned and certainly fixed to the yoke without any looseness.

What is claimed is:

1. A biaxial actuator comprising:

a slide base;

a lens holder used for adjusting a position of an objective lens with respect to the slide base;

an actuator cover arranged for covering the lens holder; and an adjusting plate, wherein the lens holder is mounted on the adjusting plate for adjusting the position of the lens holder with respect to the slide base;

a stroke of the lens holder in one direction is limited by abutment of the lens holder with the slide base; and the adjusting plate and the actuator cover are each fixed to the slide base.

2. A biaxial actuator according to claim 1, wherein the adjusting plate adjusts the lens holder in X and Y directions and/or a diagonal angle direction substantially horizontal with respect to the slide base.

3. A biaxial actuator according to claim 2, further comprising a fixing plate for fixing the adjusting plate to the slide base.

4. A biaxial actuator according to claim 2, further comprising a fixing plate for fixing the actuator cover to the slide base.

5. A biaxial actuator according to claim 2, further comprising a common fixing plate for fixing both the adjusting plate and the actuator cover to the slide base.

* * * * *